Nov. 19, 1946.    G. A. LYON    2,411,163
WHEEL TRIM
Original Filed Jan. 20, 1940    2 Sheets-Sheet 1
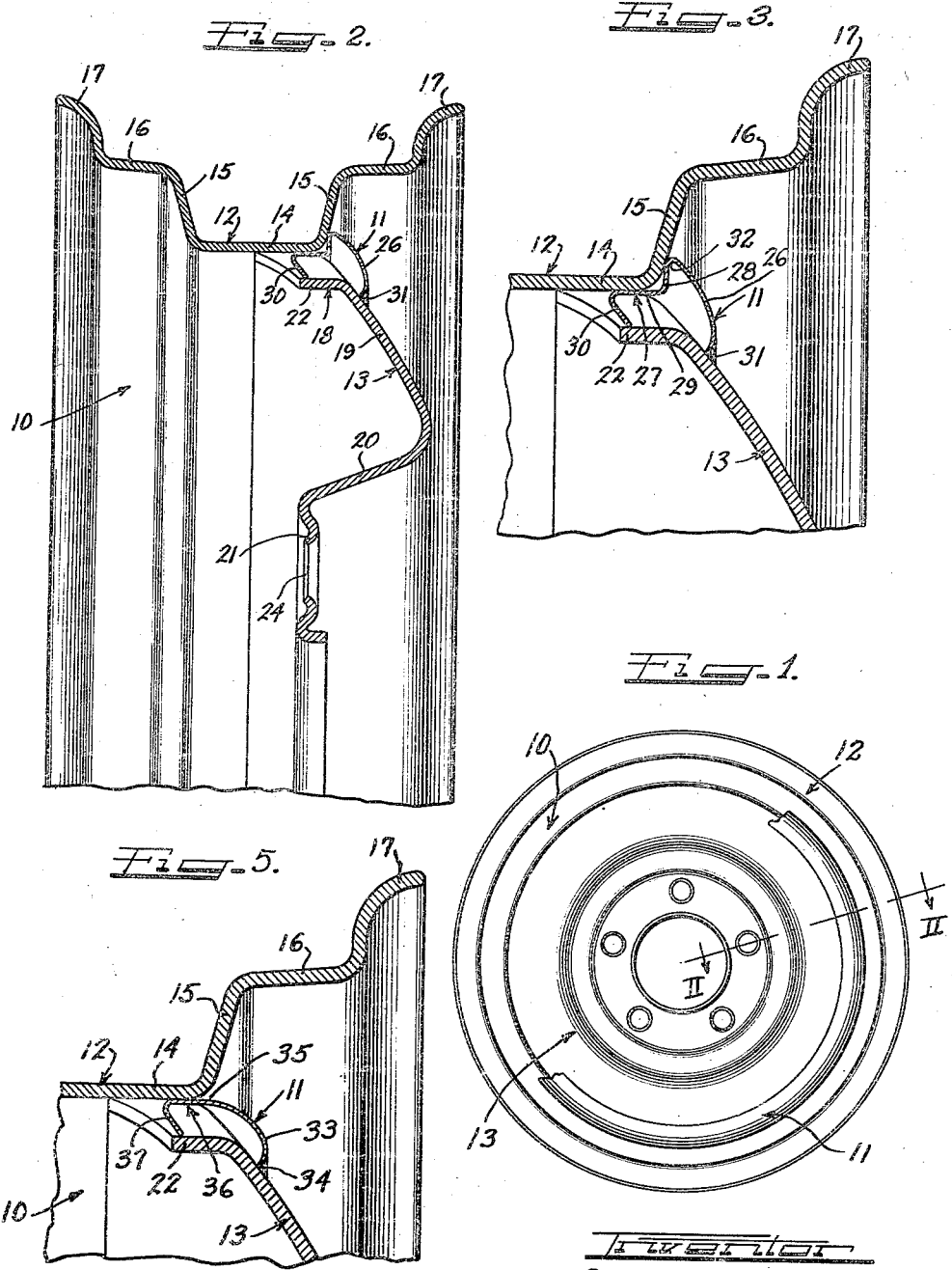
Inventor
GEORGE ALBERT LYON.

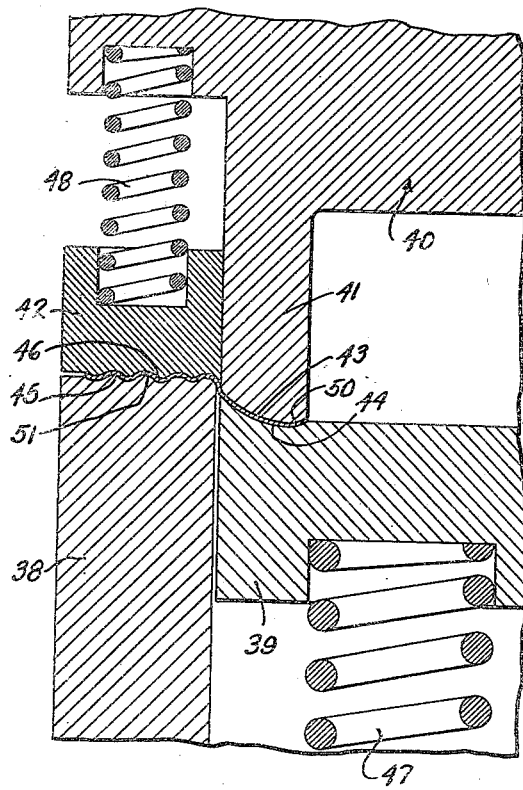
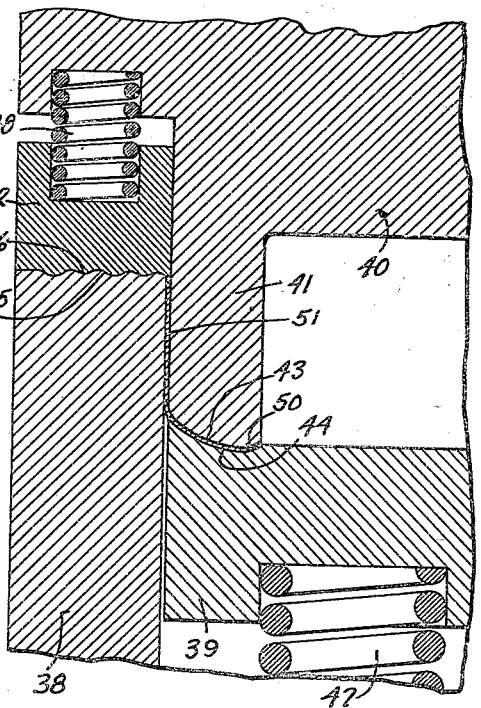
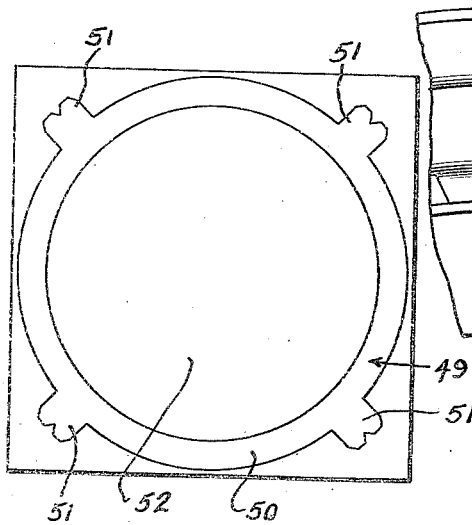
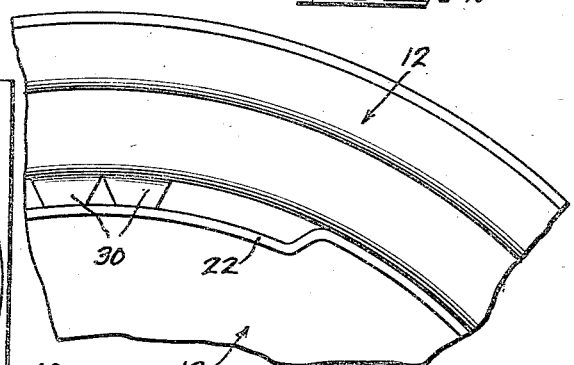

Patented Nov. 19, 1946

2,411,163

UNITED STATES PATENT OFFICE 2,411,163

WHEEL TRIM

George Albert Lyon, Allenhurst, N. J.

Original application January 20, 1940, Serial No. 314,818, now Patent No. 2,316,346, dated April 13, 1943. Divided and this application July 2, 1942, Serial No. 449,396

3 Claims. (Cl. 301—37)

This invention relates to a wheel trim and more particularly to a wheel trim which may be resiliently snapped into substantially permanent engagement with a wheel. This application is a division of my copending application, Serial Number 314,818, entitled "Method of making wheel trim," filed January 20, 1940.

The majority of vehicle wheels of today are equipped with ornamental trim members including a trim ring or annulus which is substantially permanently attached to the wheel. These trim rings are usually formed with a highly polished exterior surface and for that reason relatively expensive metal is necessary in their manufacture. In order to reduce manufacturing costs to a minimum, it is desirable to manufacture these trim rings from extremely thin metal stock. The thickness dimension or gauge of the stock employed is governed to a large extent by the nature and character of the attaching means which is formed on the wheel trim for attaching the wheel trim to the wheel.

It is an object of the present invention to provide a novel wheel trim which is secured to a wheel in a novel manner and which is manufactured from relatively thin metal stock by a novel method.

Another object of the present invention is to provide a wheel trim or trim ring having a plurality of novel attaching fingers thereon.

A further object of the present invention is to provide a wheel trim or trim ring having integral attaching fingers thereon which are cold worked in a novel manner to increase their stiffness and strength.

Another and further object of the present invention is to provide a novel apparatus for forming wheel trim or trim rings of very thin sheet metal stock.

One of the principal features of the present invention is the provision of a trim ring having integral attaching fingers thereon which fingers are cold worked in novel apparatus in which they are pushed clear through the forming die which shapes the trim ring to its desired configuration over a zig-zag or tortuous path.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a front elevational view of a vehicle wheel and trim wheel assembly, with a portion of the trim ring broken away to illustrate the portion of the wheel to which the trim ring is attached;

Figure 2 is a partial vertical sectional view of the trim ring and wheel assembly taken along the line II—II of Figure 1;

Figure 3 is an enlarged fragmentary sectional view showing the manner in which the trim ring is attached to the wheel;

Figure 4 is a fragmentary sectional rear view showing the manner in which the attaching means on the trim ring engages the wheel;

Figure 5 is an enlarged fragmentary sectional view similar to Figure 3 showing a different embodiment of the present invention;

Figures 6 and 7 are fragmentary sectional views of a die press illustrating the novel manner in which the trim ring is formed; and Figure 8 illustrates the manner in which an annulus having projecting arms is blanked from a flat sheet of metal stock.

Referring now to the embodiment of the present invention illustrated in Figures 1, 2, 3, and 4, there is shown a trim ring and wheel assembly comprising a vehicle wheel 10 and a trim ring 11. The wheel 10 comprises a rim part 12 and a body part 13. The rim 12 is of the usual drop center type and includes a base flange 14, opposite intermediate side flanges 15, opposite intermediate base flanges 16 and opposite edge portions 17. The drop center rim 12 as illustrated is of the type commonly employed in the automotive vehicle art of the present day, and, as is well known to those skilled in the art, is arranged to receive and accommodate a pneumatic tire (not shown).

The body part 13 of the wheel 10 includes, in general, a rearwardly extending outer flange 18, an outer web portion 19, a generally axially rearwardly and slightly radially inwardly extending inner web portion 20, and a radially inwardly extending wheel mounting flange 21. The rearwardly extending outer flange 18 is secured to the underside of the base flange 14 of the rim 12 in any suitable manner, such as by welding or riveting (not shown). The circumferentially spaced portions of the flange 18 are depressed radially inwardly as at 22 to permit circulation of air through the wheel. The rear edges 23 of the depressed portion 22 are cut back as is clearly shown in Figure 2 of the drawings.

The wheel mounting flange 21 is provided with an annular series of apertures 24 for the reception of the usual wheel mounting bolts (not shown), which bolts are arranged to extend therethrough and to engagement with the hub portion or brake drum of the vehicle (not shown).

The trim ring 11 includes a principal body portion 26 which is disposed on the front face of the wheel 10 to conceal the junction of the wheel body part 13 and the rim 12. The trim ring 11 also includes a plurality of attaching arms 27 which extend first radially inwardly as at 28 then axially rearwardly as at 29 along the radially inner portion or face of the rim 12. The arms 27 terminate in a pair of attaching fingers 30 which extend obliquely radially inwardly and axially forwardly into biting engagement with the depressed portion 22 of the wheel 10. The radial inner edge 31 of the trim ring 11 is seated on the body part 13 of the wheel 10 while the radial outer extremity of the trim ring 11 is bent back on itself as at 32 and is seated on the intermediate side flange 15 of the rim 12.

When the trim ring 11 is mounted on the wheel 10 the arms 27 are lined up with the openings formed by the depressed portions 22, and the trim ring 11 is then moved axially rearwardly of the wheel until the arms 27 slide into the openings formed by the depressed portions 22. As the arms 27 slide into these openings the axially rearwardly extending portion 29 of the arms 27 telescope with the base flange 14 of the rim 12 while the tips or radial inner extremities of the fingers 30 ride along the face of the depressed portion 22. The trim ring 11 is pushed axially rearwardly until the radial inner edge 31 and the turned portion 32 are seated on the body part 13 and the rim 12 respectively. Due to the angular position of the fingers 30 the radial inner extremities thereof make a biting engagement with the depressed portion 22 of the wheel 10. Any tendency for the trim ring 11 to become dislodged from the wheel 10 only causes the finger portions 30 of the arms 27 to bite deeper into the depressed portions 22 of the wheel 10. It must be understood that a very tight and substantially permanent engagement is provided for securing the trim ring 11 to the wheel 10.

In Figure 5 of the drawings I have illustrated a modified form of trim ring 11 for concealing the junction point of the body part 13 of the wheel 10 with the rim 12. More specifically, the trim ring 11 of Figure 5 includes a principal body portion 33 which is of curved or arcuate cross-section and which is provided with a radial inner edge 34 seated on the body part 13 of the wheel 10 and a radial outer portion 35 which is disposed substantially opposite the radial inner surface of the base flange 14 of the rim 12. A plurality of integral attaching arms are provided for the trim ring 11 of Figure 5 which extend axially inwardly from the radial outer portion 35 for telescoping engagement with the base flange 14 of the rim 12 and which terminate in an obliquely radially inwardly and axially forwardly extending tip portion 37. The tip portion 37 is disposed at such an angle as to make a biting engagement with the depressed portion 22 of the wheel 10. The trim ring 11 of Figure 5 is mounted on the wheel 10 in the same manner as that described in connection with Figures 1 to 4.

In connection with the description of the mounting of the trim ring 11 of Figure 5 as well as of the mounting of the trim ring 11 of Figures 1 to 4 it will be observed that due to the fact that the obliquely extending tip portions 37 and 30 respectively extend between two opposed faces a strut action is obtained which provides a very tight biting engagement. That is to say, due to the fact that the radial inner face of the base portion 14 of the rim 12 is opposite and opposed to the radial outer face of the depressed portion 22 there can be no radial outer flexing of the axially rearwardly projecting attaching arms. Furthermore, it will be seen that due to the yieldability of the curvate body portions 26 and 33 and the gripping engagement of edges 31 and 34 respectively with the surface of the body part 13, the trim ring 11 may be sprung upwardly and outwardly to augment the biting action of tips 30 and 37 respectively into the respective flanges 18.

The novel apparatus for increasing the strength in the attaching arms is illustrated in Figures 6, 7, and 8. More particularly, a portion of the die press is shown which includes the lower die part 38 in the form of an upstanding ring, a reciprocable lower die pad 39 which is mounted within the lower die ring 38, an upper die part 40 having a depending die ring 41, and an outer upper die ring 42 which is disposed around the die ring 41 and arranged for relative reciprocation with respect thereto. The lower face 43 of the upper die ring 41 and the confronting face portion 44 of the die pad 39 are arcuately curved in cross-section to give the desired configuration to the principal body portion 26 of the trim ring 11 shown in Figures 1 to 4. Lower die ring 38 and upper die ring 42 form the hold-down portion of the die press and their confronting faces are annularly corrugated as is indicated at 45 and 46 respectively. The reciprocable die pad 39 is spring biased upwardly with respect to the surrounding lower die ring 38 by means of suitable compression spring 47. The upper outer die ring 42 is spring biased downwardly with respect to the inner die ring portion 41 by means of suitable compression springs 48.

To form the trim ring 11 shown in Figures 1 to 4 of the drawings a flat sheet of relatively thin metal stock 49 is blanked to form a flat annulus 50 having four projecting arms 51. The central portion 52 of the blank 49 may be used to form a hub cap or wheel disk or any other suitable article. The annulus 50 having the projecting arms 51 is then placed in the die press which is illustrated in Figure 6, the dimensions of the relative die parts being such that the projecting arms 51 of the annulus 50 extend between the hold-down parts 38 and 42 and the principal body portion of the annulus is disposed between the confronting faces 43 and 44 of the die parts 41 and 39 respectively. The upper die member 40 is then lowered and as the outer upper die ring 42 forces the arms 51 against the lower die ring 38 the arms 51 are given a tortuous cross-sectional configuration due to the corrugations 45 and 46 in the confronting faces of the lower and upper die rings 38 and 42 respectively. As the inner upper die ring 41 forces the principal body portion of the annulus 50 against the lower die part 39 this action gives the principal body portion of the annulus 50 the desired configuration of the principal body part 26 of the trim ring 11 as shown in Figures 1 to 4.

The downward movement of the upper die member 40 is not halted at this point but is continued until the projecting arms 51 are completely drawn through the lower and upper die rings 38 and 42 respectively as is shown in Figure 7. The drawing or pulling of the arms 51 through the die parts 38 and 42 causes the arms 51 to move along a tortuous path and this movement causes a cold working of the metal in the projecting arms 51 which greatly increases their hardness and strength.

The act of drawing the metal in the projecting arms 51 over a tortuous path in the die press has the effect of providing a series of reversals of strain of the metal in the projecting arms 51 beyond the elastic limit. This of course is due to the fact that the corrugated curvature initially given the projecting arms 51 is caused to reverse as the arms are pulled over the corrugation. As will be fully understood and appreciated by those skilled in the art, this novel apparatus for working the projecting arms 51 provides a cold working of the metal without any substantial change in the gauge of the metal. It will thus be understood that a cold working of the metal is obtained quickly, efficiently, and without any substantial loss of thickness in the metal. The cold working greatly increases the strength of the metal and thereby enables the use of very thin sheet metal stock in forming the trim rings 11.

After the various die parts have been moved to the position as shown in Figure 7 the upper die member 40 is retracted and the annulus 50 is lifted out. The arms 51 are thereafter bent into the shape shown in Figures 2 and 3 to form the arms 27 of the trim ring 11.

While I have shown particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A trim ring for attachment to a wheel having a rim part and a body part secured concentrically against the inner surface of the rim part, said body part having circumferentially spaced, depressed portions at the edge thereof adjacent said rim part and having axially inwardly disposed flanges bordering said depressed portions, said trim ring including an annular part arranged to cover a portion of the wheel and retaining means for securing the same to the wheel, said retaining means including a plurality of radially inwardly, axially outwardly disposed fingers arranged for engagement with the adjacent flange of the body part when wedgingly engaged into a respective opening defined by a depressed portion of the body part, said annular part of the ring having an intermediate circular shoulder portion arranged to supportingly shoulder against an adjacent portion of the outer surface of the wheel when the fingers are wedged into the wheel opening.

2. The trim ring of claim 1 further characterized by each of the fingers having its free extremity bifurcated to provide the finger with a multiple of gripping points.

3. A trim ring for attachment to a wheel having a rim part and a body part secured concentrically against the inner surface of the rim part, said body part having circumferentially spaced, depressed portions at the edge thereof defining openings adjacent said rim part and having axially inwardly disposed flanges bordering said depressed portions, said trim ring including an annular radially inwardly extending part arranged to cover a portion of the wheel including said openings and retaining means for securing the same to the wheel, said retaining means including a plurality of generally radially inclined fingers each arranged for gripping engagement with the adjacent flange of the body part when wedgingly engaged in one of said openings, said annular part of the ring concealing said fingers and having a radially outer turned portion connected to said fingers and arranged to supportingly bear against an adjacent portion of the outer surface of the wheel when the fingers are wedged in said wheel openings.

GEORGE ALBERT LYON.